(No Model.)
W. F. NIEDRINGHAUS.
VESSEL OF ENAMELED IRON WARE.
No. 290,596. Patented Dec. 18, 1883.
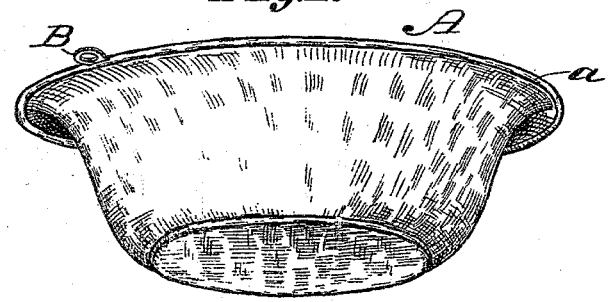
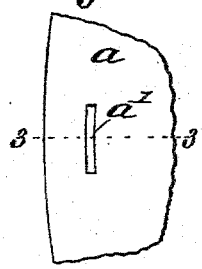 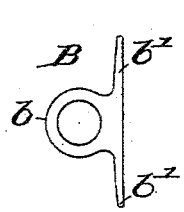 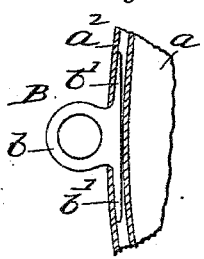 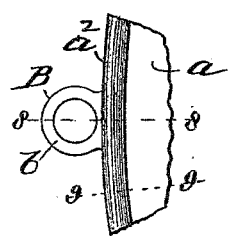
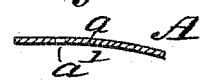 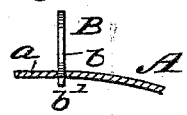 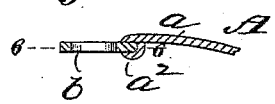
Attest:
Charles Pickles
E. A. Harten
Inventor:
William F. Niedringhaus
by C. D. Moody atty

UNITED STATES PATENT OFFICE.

WILLIAM F. NIEDRINGHAUS, OF ST. LOUIS, MISSOURI.

VESSEL OF ENAMELED IRON-WARE.

SPECIFICATION forming part of Letters Patent No. 290,596, dated December 18, 1883.

Application filed September 19, 1883. (No model.)

*To all whom it may concern:*

Be it known that I, WILLIAM F. NIEDRINGHAUS, of St. Louis, Missouri, have made a new and useful Improvement in Vessels of Enameled Iron-Ware, of which the following is a full, clear, and exact description, reference being had to the annexed drawings, making part of this specification, in which—

Figure 1 is a view in perspective of the improved vessel, and Figs. 2 to 9 details upon an enlarged scale, Fig. 2 being a view, in its developed form, of that portion of the vessel with which the improvement is immediately connected; Fig. 3, a section on the line 3 3 of Fig. 2; Fig. 4, a side view of the ring or ear; Fig. 5, an edge view of the ring or ear inserted in the perforation in the basin-flange; Fig. 6, a section on the line 6 6 of Fig. 8; Fig. 7, a side view of the ring or ear in position; Fig. 8, a section on the line 8 8 of Fig. 7, and Fig. 9 a section on the line 9 9 of Fig. 7.

The same letters of reference denote the same parts.

The present invention is an improved mode of attaching an ear or ring to enameled sheet-iron vessels—such as wash-basins. The flange $a$ of the vessel A is slit at $a'$, Figs. 2, 3. An ear or ring, B, Figs. 4, 6, having the eye $b$ and the prongs $b'\ b'$, is then inserted from beneath in the slit $a'$, as in Fig. 5. The flange $a$ is then formed into a bead, $a^2$, in which are inclosed the prongs $b'\ b'$, as shown in Figs. 6, 8, 9, and the eye $b$ projects from the bead $a^2$, as shown in Figs. 7, 8, 9, from the center of the bead and in the general direction of the vessel-flange $a$. The vessel is then enameled to protect and finish it. The enamel closes the joint around the neck of the ear, and, owing to the manner of attaching the ear, there is no projection upon the side of the bead, which would occur in case an ear were placed against the upper or under side of the vessel-flange and fastened thereto by riveting. Such a projection, when the vessels are nested, is apt to occasion injury by chafing the enamel of the adjoining vessel. It also forms a shoulder, around which dirt is liable to collect. The ear or ring shown is stamped out of sheet metal and the eye $b$ is closed.

In another application filed of even date herewith, and officially numbered 106,886, (the present application being numbered 106,885,) an ear or ring provided with an open neck, and attached to the vessel substantially as herein set forth, is described and claimed. It may be regarded as an improvement upon or modification of the present invention.

I claim—

1. A hollow vessel having a beaded edge, and provided with an ear or ring attached to said vessel, and projecting from the outer edge of the bead through a slit or opening therein, substantially as described.

2. An enameled vessel—such as a basin—provided with a beaded edge, and having a flat ear or ring projecting from the outer edge of the bead, and attached to the vessel within the thickness of the said bead, so that the said ear or ring does not overlie or underlie the bead, and therefore does not intervene between the said vessel and an adjacent one in nesting, substantially as described.

3. An enameled sheet-iron vessel having a beaded edge, and provided with an ear or ring projecting through a slit or opening in the bead, said ear or ring having prongs inclosed in the said bead, and being thereby attached to the said vessel, substantially as described.

4. The combination of the vessel A and the ear or ring B, said vessel having the slit bead $a^2$, and said ear or ring having the closed eye $b$ and prongs $b'\ b'$, substantially as described.

WM. F. NIEDRINGHAUS.

Witnesses:
 C. D. MOODY,
 GEO. W. BALDRIGE.